(12) United States Patent
Okuno et al.

(10) Patent No.: US 11,466,343 B2
(45) Date of Patent: Oct. 11, 2022

(54) METAL POROUS BODY

(71) Applicants: SUMITOMO ELECTRIC INDUSTRIES, LTD., Osaka (JP); NATIONAL UNIVERSITY CORPORATION YOKOHAMA NATIONAL UNIVERSITY, Yokohama (JP)

(72) Inventors: Kazuki Okuno, Osaka (JP); Takahiro Higashino, Osaka (JP); Hiromasa Tawarayama, Osaka (JP); Masatoshi Majima, Osaka (JP); Haruki Masumura, Yokohama (JP); Yoshiyuki Kuroda, Yokohama (JP); Shigenori Mitsushima, Yokohama (JP)

(73) Assignees: SUMITOMO ELECTRIC INDUSTRIES, LTD., Osaka (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 16/970,992

(22) PCT Filed: Dec. 6, 2018

(86) PCT No.: PCT/JP2018/044858
§ 371 (c)(1),
(2) Date: Aug. 19, 2020

(87) PCT Pub. No.: WO2019/163256
PCT Pub. Date: Aug. 29, 2019

(65) Prior Publication Data
US 2020/0377973 A1     Dec. 3, 2020

(30) Foreign Application Priority Data
Feb. 22, 2018  (JP) .............................. JP2018-029710

(51) Int. Cl.
| | | |
|---|---|---|
| *C22C 1/08* | (2006.01) | |
| *C22C 18/00* | (2006.01) | |
| *C22C 19/03* | (2006.01) | |

(52) U.S. Cl.
CPC ................ *C22C 1/08* (2013.01); *C22C 18/00* (2013.01); *C22C 19/03* (2013.01)

(58) Field of Classification Search
None
See application file for complete search history.

(56) References Cited

U.S. PATENT DOCUMENTS

| | | | |
|---|---|---|---|
| 6,051,117 A | 4/2000 | Novak et al. | |
| 2008/0149571 A1* | 6/2008 | Zeller .................. | B01D 71/022 428/550 |

(Continued)

FOREIGN PATENT DOCUMENTS

| | | |
|---|---|---|
| EP | 2764916 A1 | 8/2014 |
| JP | 2011-225950 A | 11/2011 |

(Continued)

OTHER PUBLICATIONS

English translation of JP2012-041608, EPO, accessed Jan. 11, 2021.*

(Continued)

*Primary Examiner* — Xiaobei Wang
(74) *Attorney, Agent, or Firm* — Oliff PLC

(57) ABSTRACT

A metal porous body having a three-dimensional network structure, includes: a framework forming the three-dimensional network structure; and a coating layer having fine pores and coating the framework, the three-dimensional network structure including a rib and a node connecting a plurality of ribs, the framework including an alkali-resistant first metal, the fine pores having an average fine pore diameter of 10 nm or more and 1 μm or less, the coating (Continued)

layer including an alkali-resistant second metal and optionally including an alkali-soluble metal, the alkali-soluble metal being contained at a proportion of 0% by mass or more and 30% by mass or less with reference to a total mass of the framework and the coating layer.

6 Claims, 7 Drawing Sheets

(56) References Cited

U.S. PATENT DOCUMENTS

| | | |
|---|---|---|
| 2012/0067731 A1 | 3/2012 | Hosoe et al. |
| 2014/0335441 A1 | 11/2014 | Tsukamoto et al. |
| 2016/0130678 A1 | 5/2016 | Okuno et al. |

FOREIGN PATENT DOCUMENTS

| | | | | |
|---|---|---|---|---|
| JP | 2012-041608 A | | 3/2012 | |
| JP | 2012-214879 A | | 11/2012 | |
| JP | 2015-004088 A | | 1/2015 | |
| JP | 2015-137365 A | | 7/2015 | |
| JP | 2016000862 A | * | 1/2016 | ......... B01D 39/2034 |
| JP | 6182140 | * | 8/2017 | |

OTHER PUBLICATIONS

Sumitomo Electric, "Celmet", <http://global-sei.com/celmet/process.html> <http://global-sei.com/celmet/grade.html>, Sep. 24, 2017 as captured by web.archive.org (Year: 2017).*

Ramazan Solmaz et al. "Fabrication and Characterization of NiCoZn-M (M: Ag, Pd AND Pt) Electrocatalysts as Cathode Materials for Electrochemical Hydrogen Production". International Journal of Hydrogen Energy, vol. 36, No. 19, Jun. 19, 2011, pp. 12079-12087.

Apr. 2, 2021 Office Action issued in Chinese Patent Application No. 201880089903.8.

Man Shiqing et al. "Preparation of Sub-Micron Porous Materials by Dealloying Cu-Based Sn—Zn Alloy". Journal of Shaanxi University of Science and Technology, vol. 29, No. 3, pp. 15-17.

* cited by examiner

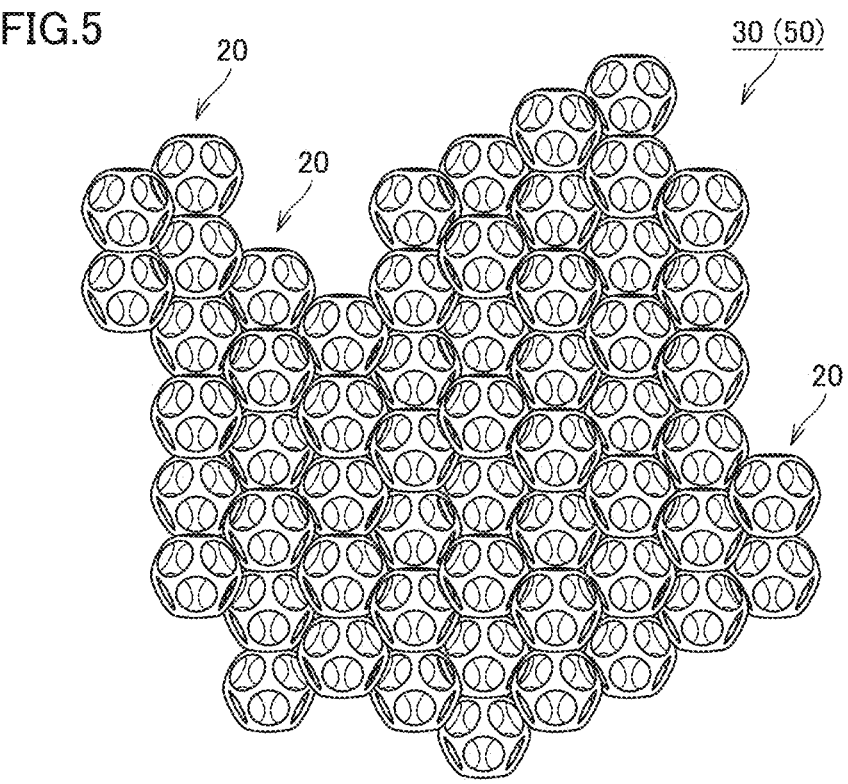

METAL POROUS BODY

TECHNICAL FIELD

The present disclosure relates to a metal porous body. The present application claims priority based on Japanese Patent Application No. 2018-029710 filed on Feb. 22, 2018. The disclosure in the Japanese patent application is entirely incorporated herein by reference.

BACKGROUND ART

Conventionally, metal porous bodies have been used in various applications such as filters, electrode plates for batteries, catalyst carriers, metal composite materials, and the like requiring heat resistance. As a method for producing a metal porous body, a method in which a foamed resin or the like is subjected to a treatment imparting conductiveness thereto and subsequently electroplated and a method in which powdery metal is adhered to foamed resin or the like and sintered are mainly known methods.

CITATION LIST

Patent Literature

PTL 1: Japanese Patent Laying-open No. 2012-214879

SUMMARY OF INVENTION

The presently disclosed metal porous body is
a metal porous body having a three-dimensional network structure, comprising:
a framework forming the three-dimensional network structure; and
a coating layer having fine pores and coating the framework,
the three-dimensional network structure including a rib and a node connecting a plurality of ribs,
the framework including an alkali-resistant first metal,
the fine pores having an average fine pore diameter of 10 nm or more and 1 µm or less,
the coating layer including an alkali-resistant second metal and optionally including an alkali-soluble metal,
the alkali-soluble metal being contained at a proportion of 0% by mass or more and 30% by mass or less with reference to a total mass of the framework and the coating layer.

BRIEF DESCRIPTION OF DRAWINGS

FIG. 5 is a schematic diagram showing one embodiment of a three-dimensional network structure formed by a plurality of cells joined together.

DETAILED DESCRIPTION

Figure 1A:
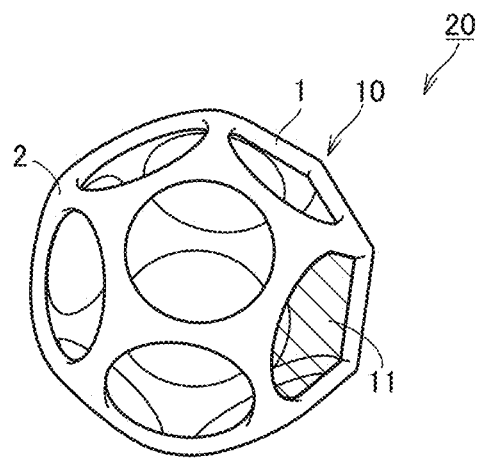
FIG. 1A is an enlarged schematic diagram focusing on one cell in a metal porous body having a three-dimensional network structure according to one embodiment.

Problems to be Solved by the Present Disclosure

For example, Japanese Patent Laying-Open No. 2012-214879 (PTL 1) discloses that an anodic oxide coating is formed on a surface of a metal porous body, the surface being composed of a plurality of smooth rib-shaped frameworks connected in a network three-dimensionally. Further, PTL 1 also discloses that the metal porous body can be produced in a plating method, and for example, PTL 1 also discloses forming a metal porous body from aluminum or an aluminum alloy produced in the plating method.

Such a metal porous body has a large surface area and is particularly suitable for an electrode and a carrier for a catalyst in alkaline water electrolysis. However, there is a demand for further improvement in the performance of the metal porous body, such as further increased surface area and increased strength.

The present disclosure has been made in view of the above circumstances, and an object thereof is to provide a metal porous body having a large surface area per unit volume and also having excellent strength.

Advantageous Effect of the Present Disclosure

According to the above, a metal porous body having a large surface area per unit volume and also having excellent strength can be provided.

Description of Embodiments of the Present Disclosure

Initially, the contents of one aspect of the present disclosure will be enumerated.
[1] The presently disclosed metal porous body is
a metal porous body having a three-dimensional network structure, comprising:
a framework forming the three-dimensional network structure; and
a coating layer having fine pores and coating the framework,
the three-dimensional network structure including a rib and a node connecting a plurality of ribs,
the framework including an alkali-resistant first metal,
the fine pores having an average fine pore diameter of 10 nm or more and 1 µm or less,
the coating layer including an alkali-resistant second metal and optionally including an alkali-soluble metal,
the alkali-soluble metal being contained at a proportion of 0% by mass or more and 30% by mass or less with reference to a total mass of the framework and the coating layer.

The metal porous body that includes a coating layer having fine pores has an increased surface area per unit volume. Furthermore, the metal porous body having a framework including an alkali-resistant first metal has excellent strength.

[2] The fine pores have an average fine pore diameter of 10 nm or more and 200 nm or less. By defining in this way, it can be expected to obtain a metal porous body having a larger surface area per unit volume.

[3] The coating layer is composed of an alloy including the alkali-resistant second metal and the alkali-soluble metal, and the alkali-soluble metal is contained at a proportion exceeding 0% by mass and 30% by mass or less with reference to the total mass of the framework and the coating layer. By defining in this way, the metal porous body has a larger surface area per unit volume and hence excellent strength.

[4] The alloy including the alkali-resistant second metal and the alkali-soluble metal is a NiZn alloy. By defining in this way, the metal porous body has a larger surface area per unit volume.

[5] The metal porous body has a porosity of 40% or more and 97% or less. By defining in this way, the metal porous body has a larger surface area per unit volume.

[6] When the framework is observed in cross section at a magnification of 3,000 times, five or less voids having a longer diameter of 1 μm or more are observed in any area 10 μm square. By defining in this way, the metal porous body is further excellent in strength.

[7] The alkali-resistant first metal includes at least one selected from the group consisting of Ni, Fe, Ti, Cr and Co. By defining in this way, the metal porous body is excellent in strength and, in addition, in alkali resistance.

[8] The rib and the node are internally hollow. By defining in this way, the metal porous body is excellent in strength and in addition, lightweight.

[9] The hollow is triangular in shape in a cross section orthogonal to the longitudinal direction of the rib. By defining in this way, the metal porous body is further excellent in strength.

Details of Embodiments of the Present Disclosure

Hereinafter, an embodiment of the present disclosure (hereinafter also referred to as "the present embodiment") will be described. It should be noted, however, that the present embodiment is not exclusive. In the present specification, an expression in the form of "A-B" means a range's upper and lower limits (that is, A or more and B or less), and when A is not accompanied by any unit and B is alone accompanied by a unit, A has the same unit as B. Furthermore, in the present specification, when a compound (an alloy) is represented by a chemical formula with its constituent elements having a composition ratio unspecified, such as "NiZn," the chemical formula shall encompass any conventionally known composition ratio (or elemental ratio). The chemical formula shall include not only a stoichiometric composition but also a nonstoichiometric composition. For example, the chemical formula of "NiZn" includes not only a stoichiometric composition of "$Ni_1Zn_1$" but also a nonstoichiometric composition for example of "$Ni_1Zn_{0.8}$." This also applies to descriptions for compounds other than "NiZn."

<<Metal Porous Body>>

The presently disclosed metal porous body is a metal porous body having a three-dimensional network structure, comprising:

a framework forming the three-dimensional network structure; and a coating layer having fine pores and coating the framework, the three-dimensional network structure including a rib and a node connecting a plurality of ribs, the framework including an alkali-resistant first metal, the fine pores having an average fine pore diameter of 10 nm or more and 1 μm or less, the coating layer including an alkali-resistant second metal and optionally including an alkali-soluble metal, the alkali-soluble metal being contained at a proportion of 0% by mass or more and 30% by mass or less with reference to a total mass of the framework and the coating layer.

The metal porous body may have an external appearance shaped in a sheet, a rectangular parallelepiped, a sphere, a cylinder or the like. When the metal porous body has an external appearance in the form of a sheet, the sheet may have a thickness of 0.1 mm or more and 5 mm or less, or 0.5 mm or more and 3 mm or less. The thickness can be measured for example with a digital thickness gauge.

<Three-Dimensional Network Structure>

In the present embodiment, a "three-dimensional network structure" means a structure in which a solid component (e.g., metal or the like) constituting the three-dimensional network structure spreads three-dimensionally in a network. The three-dimensional network structure is formed by a framework. Hereinafter, the three-dimensional network structure will more specifically be described.

Figure 1B:
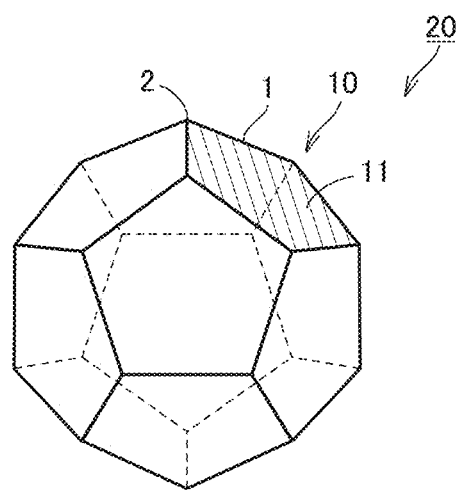
FIG. 1B is a schematic diagram showing an embodiment of the shape of the cell.

FIG. 1A is an enlarged schematic diagram focusing on one cell in a metal porous body having a three-dimensional network structure according to the present embodiment. A three-dimensional network structure 30, as described above, has a cell 20, which will be described hereinafter, as a basic unit, and is formed of a plurality of cells 20 joined together (see FIG. 5 for example). The three-dimensional network structure includes a rib 1 and a node 2 connecting a plurality of ribs 1 (see FIGS. 1A and 1B). While rib 1 and node 2 will be described separately for the sake of convenience, there is no clear boundary therebetween, and a plurality of ribs and a plurality of nodes integrally form the three-dimensional network structure. Hereinafter, in order to facilitate understanding, a cell shown in FIG. 1A will be described as a regular dodecahedron shown in FIG. 1B.

Initially, a plurality of ribs 1 and a plurality of nodes 2 are used to form a frame 10 in the form of a planar polygonal structure. While in FIG. 1B the polygonal structure is a regular pentagon, it may be a different polygon such as a triangle, a quadrangle, or a hexagon. Herein, the structure of frame 10 can also be understood such that a plurality of ribs 1 and a plurality of nodes 2 form a planar polygonal aperture. In the present embodiment, the planar polygonal aperture has an aperture diameter (hereinafter also referred to as a "window diameter"), which means a diameter of a circle circumscribing the planar polygonal aperture defined by frame 10.

Figure 2A:
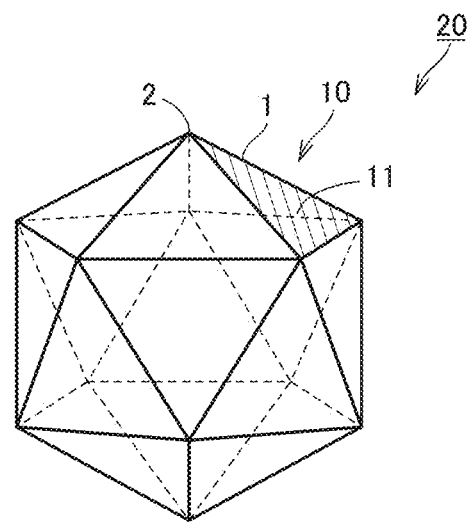
FIG. 2A is a schematic diagram showing another embodiment of the shape of the cell.
Figure 2B:
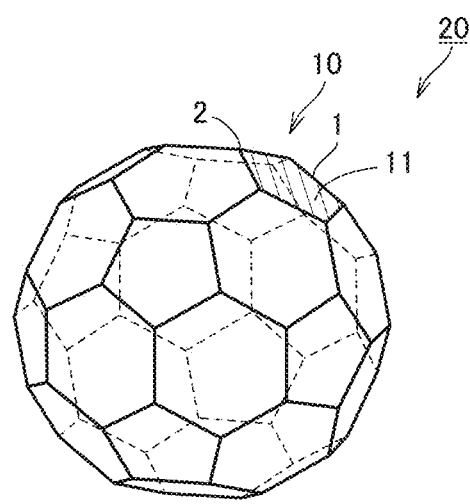
FIG. 2B is a schematic diagram showing another embodiment of the shape of the cell.

A plurality of frames 10 are combined together to form cell 20 that is a three-dimensional, polyhedral structure. In doing so, one rib 1 and one node 2 are shared by a plurality of frames 10. Node 2 may be shaped to have a vertex to have a sharp edge, the vertex chamfered to have a planar shape, or the vertex rounded to have a curved shape. While in FIG. 1B the polyhedral structure is a dodecahedron, it may be other polyhedrons such as a cube, an icosahedron (see FIG. 2A), and a truncated icosahedron (see FIG. 2B). Herein, the structure of cell 20 can also be understood as forming a three-dimensional space surrounded by a virtual plane 11 defined by each of a plurality of frames 10. In the present embodiment, it can be understood that the three-dimensional space has a pore with a diameter (hereinafter also referred to as a "pore diameter") which is a diameter of a sphere circumscribing the three-dimensional space defined by cell 20. Note, however, that in the present embodiment the metal porous body's pore diameter is calculated based on a calculation formula for the sake of convenience, as will be described hereinafter.

Figure 3:
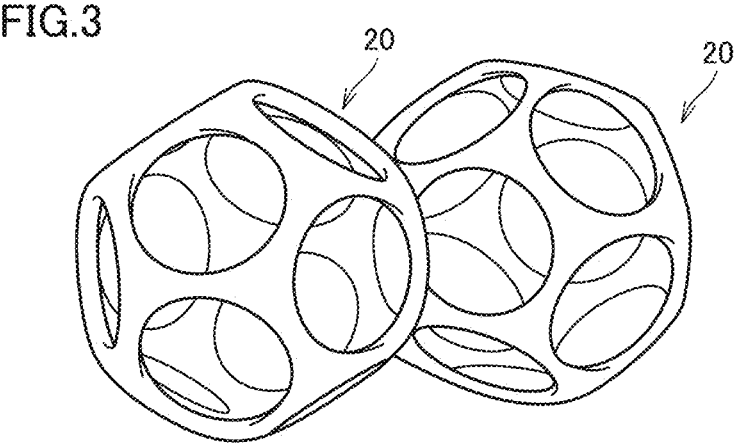
FIG. 3 is a schematic diagram showing two cells joined together.
Figure 4:
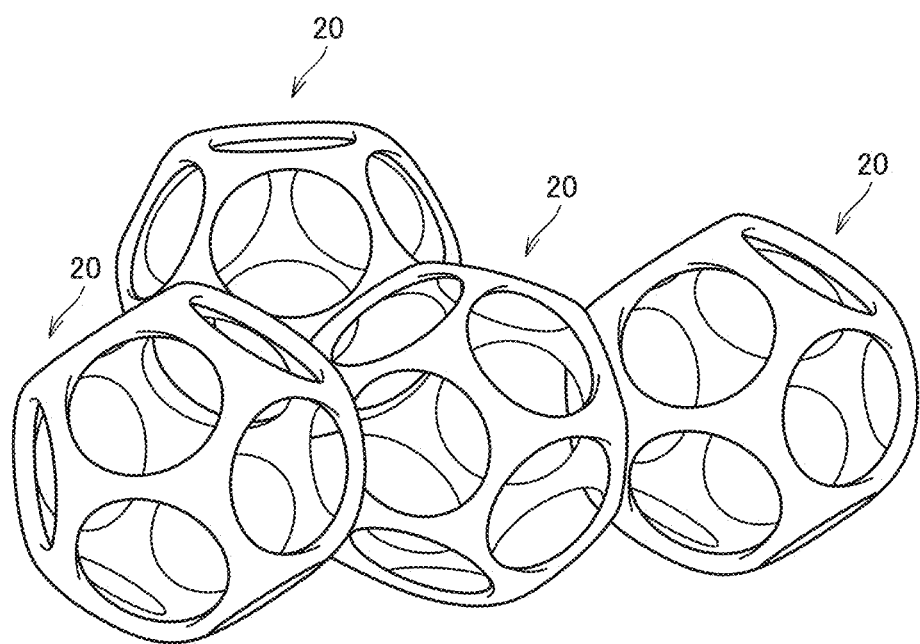
FIG. 4 is a schematic diagram showing four cells joined together.

Finally, a plurality of cells 20 are combined together to form three-dimensional network structure 30 (see FIGS. 3 to 5). In doing so, frame 10 is shared by a plurality of cells 20. Frame 10 may be shared by two cells 20. Note that three-dimensional network structure 30 can also be understood to include frame 10. Furthermore, three-dimensional network structure 30 can also be understood to include cell 20.

The metal porous body in the present embodiment thus has a three-dimensional network structure that forms a planar polygonal aperture (or a frame) and a three-dimensional space (or a cell). Therefore, the metal porous body can be clearly distinguished from a two-dimensional network structure only having a planar aperture (e.g., a punched metal, a gridiron, etc.). Furthermore, the metal porous body in the present embodiment has a plurality of ribs and a plurality of nodes integrated together to form a three-dimensional network structure. Therefore, it can be clearly distinguished from a structure such as a non-woven fabric formed by intertwining fibers each serving as a constituent unit. The metal porous body having such a three-dimensional network structure can have continuous pores.

The three-dimensional network structure according to the present embodiment is not limited to the above-described structure. For example, cell 20 may be formed of a plurality of frames 10 each having a different size and a different planar shape. The three-dimensional network structure may be formed of a plurality of cells 20 each having a different size and a different three-dimensional shape. The three-dimensional network structure may partially include frame 10 without having a planar polygonal aperture therein or may partially include cell 20 without having a three-dimensional space therein (or cell 20 having a solid interior).

The metal porous body has a porosity preferably of 40% or more and 97% or less, more preferably 45% or more and 97% or less, still more preferably 50% or more and 97% or less. The metal porous body having a porosity of 40% or more can be significantly lightweight and also have an increased surface area. The metal porous body having a porosity of 97% or less can have sufficient strength.

The metal porous body's porosity is defined by the following expression:

$$\text{Porosity (\%)} = [1 - \{M_p/(V_p \times d_p)\}] \times 100,$$

where $M_p$: mass of metal porous body [g], $V_p$: volume of shape of external appearance of metal porous body [cm$^3$], and $d_p$: density of metal constituting metal porous body [g/cm$^3$].

The metal porous body preferably has an average pore diameter of 350 μm or more and 3,500 μm or less. The average pore diameter of 350 μm or more can enhance the metal porous body in strength. The average pore diameter of 3,500 μm or less can enhance the metal porous body in bendability. From these viewpoints, the metal porous body has an average pore diameter more preferably of 350 μm or more and 1,000 μm or less, still more preferably 350 μm or more and 850 μm or less. The metal porous body's average pore diameter is determined as follows: the metal porous body has a surface thereof observed with a microscope in at least 10 fields of view and an average number ($n_c$) of cells per 1 inch (25.4 mm=25,400 μm) is determined and applied to the following expression:

Average pore diameter(μm)=25,400 μm/$n_c$.

Figure 6A:
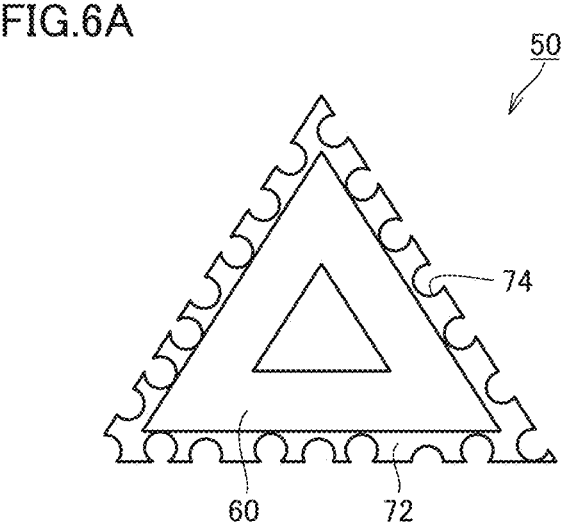
FIG. 6A schematically shows a cross section of a rib orthogonal to its longitudinal direction.

FIG. 6A schematically shows a cross section of a rib orthogonal to its longitudinal direction. A metal porous body 50 includes a framework 60 that forms three-dimensional network structure 30, and a coating layer 72 that has fine pores 74 and coats framework 60. Each constituent will be described below.

<Framework>

In the present embodiment, a "framework" means a base material for the above metal porous body, and is used for forming a coating layer having fine pores, as will be described hereinafter. The framework forms the three-dimensional network structure. Furthermore, the framework's porosity and average pore diameter are defined in the same manner as the above-described metal porous body's porosity and average pore diameter. If the existence of the coating layer is ignored, the framework's porosity and average pore diameter are equal to the metal porous body's porosity and average pore diameter.

The framework includes an alkali-resistant first metal. By defining in this way, the metal porous body according to the present embodiment can stably exist even in an environment in an alkaline aqueous solution. Herein, being "alkali-resistant" refers to such a property that when such a metal is brought into contact with an 8 mol/L aqueous solution of sodium hydroxide having a temperature of 70° C. for 24 hours the metal dissolves in an amount of less than 20% by mass. When the metal is dissolved in a large amount, it affects the metal porous body's strength in use. Accordingly, when brought into contact with the 8 mol/L aqueous solution of sodium hydroxide having the temperature of 70° C. for 24 hours, the alkali-resistant first metal, as described above, and an alkali-resistant second metal, as will be described hereinafter, preferably dissolve in an amount of less than 5% by mass, more preferably less than 0.5% by mass. Although the alkali-resistant first metal is not particularly limited, examples thereof include a simple substance of metal such as Ni, Fe, Ti, Cr and Co, an alloy of these metals, and various types of stainless steel. That is, the alkali-resistant first metal preferably includes at least one selected from the group consisting of Ni, Fe, Ti, Cr and Co. Further, the alkali-resistant first metal preferably includes Ni. In one aspect of the present embodiment, the alkali-resistant first metal may be Ni.

In one aspect of the present embodiment, the framework may include an alkali-soluble metal, as will be described hereinafter, in addition to the alkali-resistant first metal. The alkali-soluble metal may be contained at a proportion of 0% by mass or more and 15% by mass or less with reference to a total mass of the framework and a coating layer which will be described hereinafter. The alkali-soluble metal included in the framework may be the same as or different from the alkali-soluble metal included in the coating layer.

Furthermore, in another aspect of the present embodiment, the framework may have fine pores. The fine pores may have an average fine pore diameter of 10 nm or more and 1 μm or less, or 10 nm or more and 200 nm or less. The fine pores having an average fine pore diameter set within the above range allow the metal porous body to have an increased surface area. How the fine pores' average fine pore diameter is determined will be described hereinafter.

The framework preferably has a mass per unit volume (or an apparent density) of 0.2 g/cm³ or more and 0.7 g/cm³ or less, more preferably 0.3 g/cm³ or more and 0.5 g/cm³ or less. Herein, the "framework's apparent density" is defined by the following expression:

Framework's apparent density(g/cm³)=$M_f$(g)/$V_f$(cm³).

$M_f$: mass of framework [g]
$V_f$: volume of shape of external appearance of framework [cm³]

The rib and node forming the framework are preferably internally hollow. This allows the metal porous body to be significantly lightweight.

The hollow may be generally triangular in shape in a cross section orthogonal to the longitudinal direction of the rib. The hollow may be triangular in shape in a cross section orthogonal to the longitudinal direction of the rib. That is, in the present embodiment, a "triangle" is a concept including not only a geometrical triangle but also a substantial triangle. This also applies to other shapes described hereinafter. In another aspect of the present embodiment, the hollow may be generally circular, quadrangular or hexagonal in shape in a cross section orthogonal to the longitudinal direction of the rib.

In still another aspect of the present embodiment, the hollow may be circular, quadrangular or hexagonal in shape in a cross section orthogonal to the longitudinal direction of the rib.

In the present embodiment, when the framework is observed in cross section at a magnification of 3,000 times, preferably five or less, more preferably three or less voids having a longer diameter of 1 μm or more are observed in any area 10 μm square. The metal porous body can thus have sufficient strength. Furthermore, it is thus understood that the framework according to the present embodiment is different from a formed body obtained by sintering fine powder. While the number of voids observed does not have a lower limit, it is for example zero. Herein, the above "number of voids" means an average value in number of voids determined by observing each of a plurality of "areas 10 μm square" in a cross section of the framework. The framework can be observed in cross section by using an electron microscope for example. Specifically, the above observation is done preferably in 10 or more fields of view, more preferably 15 or more fields of view.

Figure 6B:
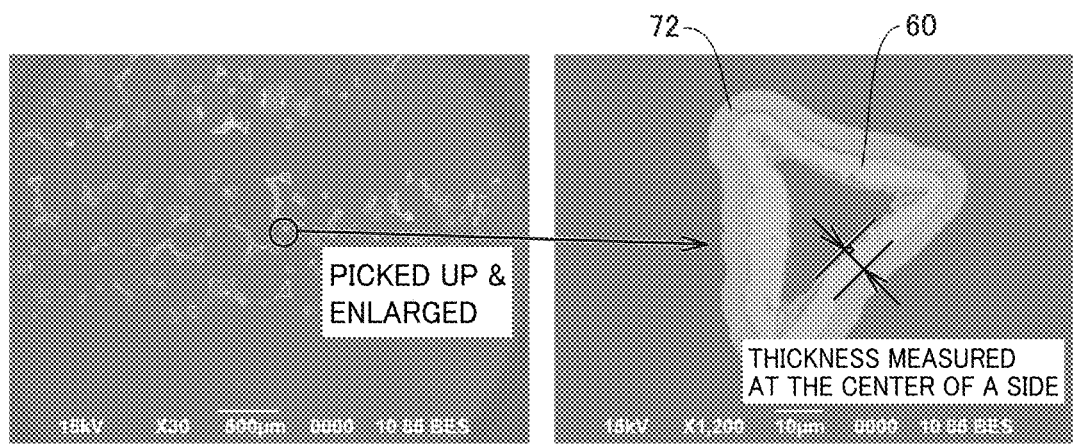
FIG. 6B is a photographical image for illustrating a method for measuring a framework's average thickness.

When the rib and node forming the framework are internally hollow, the framework preferably has an average thickness of 8 μm or more and 50 μm or less. Herein, "the framework's average thickness" means an average value of shortest distances from a surface defining the hollow inside the framework to an interface of the framework and the coating layer. The framework's average thickness can be determined through an observation with an electron microscope for example. Specifically, the framework's average thickness is determined in the following method. Initially, the metal porous body is observed in cross section, and one portion which is a cross section which is substantially vertical to a long side (or a rib) of the framework is enlarged. Subsequently, in the enlarged cross section, a polygon (for example, a triangle) forming the rib that is the framework has one side measured in thickness at a center of that side (see FIG. 6B). The above observation is preferably performed at at least 10 or more locations, more preferably 15 or more locations.

<Coating Layer>

According to the present embodiment, a coating layer has fine pores. The fine pores have an average fine pore diameter of 10 nm or more and 1 μm or less, preferably 10 nm or more and 200 nm or less. Herein, the fine pores' average fine pore diameter means a value obtained by averaging diameters of openings observed on a surface of the coating layer. The diameter of an opening is a maximum value of distances each between two points located on a circumference defining the opening. The fine pores having an average fine pore diameter set within the above range allow the metal porous body to have an increased surface area. The fine pores' average fine pore diameter can be determined for example through an observation with an electron microscope. The above observation is preferably performed at at least 10 or more locations, more preferably 15 or more locations.

The coating layer includes an alkali-resistant second metal and may include an alkali-soluble metal. The coating layer is preferably composed of an alloy including the alkali-resistant second metal and the alkali-soluble metal. In other words, the coating layer is preferably composed of an alloy including the alkali-resistant second metal and the alkali-soluble metal as constituent elements. Herein, being "alkali-soluble" refers to a property allowing such a metal to be dissolved in an amount of 20% by mass or more when brought into contact with an 8 mol/L aqueous solution of sodium hydroxide having a temperature of 70° C. for 24 hours. If the metal is dissolved in a small amount, it results in a reduced ability to form the fine pores, produces sludge when the metal dissolves, or the like. Accordingly, when brought into contact with the 8 mol/L aqueous solution of sodium hydroxide having the temperature of 70° C. for 24 hours, the alkali-soluble metal dissolves preferably in an amount of 50% by mass or more, more preferably 70% by mass or more.

Although the alkali-resistant second metal is not particularly limited, examples thereof include a simple substance of metal such as Ni, Fe, Ti, Cr and Co, an alloy of these metals, and various types of stainless steel. That is, the alkali-resistant second metal preferably includes at least one selected from the group consisting of Ni, Fe, Ti, Cr and Co. In one aspect of the present embodiment, the alkali-resistant second metal may be Ni. The alkali-resistant second metal may be a metal identical to or different from the alkali-resistant first metal.

While the alkali-soluble metal is not particularly limited, examples thereof include Zn, Al, and Sn.

In one aspect of the present embodiment, an alloy including the alkali-resistant second metal and the alkali-soluble metal is preferably a NiZn alloy. The NiZn alloy preferably includes $Ni_2Zn_{11}$. In another aspect of the present embodiment, the NiZn alloy preferably includes a γ phase.

The alkali-soluble metal is contained at a proportion of 0% by mass or more and 30% by mass or less, preferably exceeding 0% by mass and 30% by mass or less, more preferably exceeding 0% by mass and 15% by mass or less with reference to a total mass of the framework and the coating layer. The proportion can be determined for example using a high frequency inductively coupled plasma mass spectrometer (ICP-MS device) or an X-ray fluorescence analyzer (XRF analyzer) for analysis for a surface of the metal porous body.

In one aspect of the present embodiment, preferably, the coating layer is composed of an alloy including the alkali-resistant second metal and the alkali-soluble metal, and the alkali-soluble metal is contained at a proportion exceeding 0% by mass and 30% by mass or less with reference to the total mass of the framework and the coating layer.

The metal porous body according to the present embodiment has a large surface area per unit volume and is also excellent in strength, as described above. Therefore, it can be suitably used for an electrode, a catalyst and its carrier, a filter, an adsorbent and the like in alkaline water electrolysis.

<<Method for Manufacturing Metal Porous Body>>

A method for manufacturing a metal porous body according to the present embodiment comprises:

preparing a framework having a three-dimensional network structure and including an alkali-resistant first metal;

forming on the framework a coating including an alkali-resistant second metal and an alkali-soluble metal;

subjecting the formed coating layer to a heat treatment; and immersing the heat-treated coating layer in an alkaline aqueous solution to remove the alkali-soluble metal from the coating layer.

<Preparing the Framework>

In this step, a framework serving as a base material for forming a coating layer is prepared. The framework has a three-dimensional network structure. The framework is not particularly limited insofar as it contains the alkali-resistant first metal, and an example thereof is Celmet® of Ni manufactured by Sumitomo Electric Industries, Ltd.

When a framework as desired is commercially unavailable, it may be produced in the following method: Initially, a sheet of a resin molded body having a three-dimensional network structure (hereinafter also simply referred to as a "resin molded body") is prepared. Polyurethane resin, melamine resin, or the like can be used as the resin molded body. Furthermore, a conductiveness imparting treatment step is performed to form a conductive layer on a surface of the resin molded body. The conductiveness imparting treatment can for example be performed by: applying a conductive paint containing carbon, conductive ceramic or similarly conductive particles; forming a layer of a conductive metal such as nickel and copper by electroless plating; forming a layer of a conductive metal by vapor deposition or sputtering; or the like. Subsequently, the resin molded body having a surface with the conductive layer formed thereon is used as a base material to perform the step of nickel electroplating. The nickel electroplating may be performed in a known method.

Finally, a heat treatment or the like can be performed to perform the step of removing the resin molded body used as the base material to obtain a framework having a three-dimensional network structure. The framework has an average pore diameter substantially equal to that of the resin molded body used as the base material. Accordingly, an average pore diameter for the resin molded body may be selected, as appropriate, depending on that for the framework to be produced. As the framework has a porosity determined by a final amount of metal, an amount of metal adhering by plating and the like may be selected as appropriate depending on the porosity for the framework to be produced. The resin molded body's porosity and average pore diameter are defined in the same manner as the above-described metal porous body's porosity and average pore diameter.

<Step of Forming the Coating Layer>

In this step, a coating layer including an alkali-resistant second metal and an alkali-soluble metal is formed on the framework. Although the coating layer is not limited in how it is formed insofar as the coating layer can be uniformly formed on the framework, it is for example formed by plating.

The plating is preferably electroplating. When the coating layer is formed on the framework by electroplating, the framework is used as a cathode. While the anode is not particularly limited, it is for example glassy carbon, a metal exemplified as the first metal, a metal exemplified as the second metal, a titanium-insoluble anode, or the like. Inter alia, the metal exemplified as the first metal and the metal exemplified as the second metal are preferably used as the anode.

The electroplating employs a plating bath, which is for example a sulfuric acid bath, a sulfamic acid bath, an ammonium chloride bath, a potassium chloride bath or the like. The plating bath may be a commercially available plating bath as it is. When the alkali-resistant second metal and the alkali-soluble metal are Ni and Zn, respectively, the commercially available plating bath include Dainjin Alloy (trade name) manufactured by Daiwa Kasei Industry Co., Ltd.

When a plating bath including the alkali-resistant second metal and the alkali-soluble metal is used, the alkali-resistant second metal in the plating bath preferably has a molar concentration of 0.3 mol/L or more and 3 mol/L or less, more preferably 0.3 mol/L or more and 1 mol/L or less. Further, the alkali-soluble metal in the plating bath preferably has a molar concentration of 0.3 mol/L or more and 3 mol/L or less, more preferably 0.3 mol/L or more and 1 mol/L or less.

When a plating bath including Ni and Zn is used, Ni in the plating bath preferably has a molar concentration 0.3 mol/L or more and 3 mol/L or less, more preferably 0.3 mol/L or more and 1 mol/L or less. Further, Zn in the plating bath preferably has a molar concentration of 0.3 mol/L or more and 3 mol/L or less, more preferably 0.3 mol/L or more and 1 mol/L or less.

NiZn alloy planting is provided preferably in an amount of 0.03 $g/cm^3$ or more and 0.4 $g/cm^3$ or less, more preferably 0.08 $g/cm^3$ or more and 0.2 $g/cm^3$ or less. The planting is provided in an amount of less than 0.03 $g/cm^3$, it is difficult to plate the framework's entire surface with the NiZn alloy, and a fine surface tends to decrease in a heat treatment and an alkali treatment in a subsequent step. When the plating is provided in an amount exceeding 0.4 $g/cm^3$, the metal porous body's strength tends to decrease after Zn is removed in the subsequent step by the heat treatment and the alkali treatment.

The electroplating is performed with a current having a density preferably of 0.05 $A/m^2$ or more and 0.3 $A/m^2$ or less, more preferably 0.1 $A/m^2$ or more and 0.25 $A/m^2$ or less.

<Step of Subjecting the Coating Layer to a Heat Treatment>

In this step, the coating layer formed in the above step undergoes a heat treatment. Even if the coating layer includes the alkali-soluble metal (e.g., Zn) in an uneven distribution in amount, subjecting the coating layer to the heat treatment promotes thermal diffusion, and the coating layer thus includes the alkali-soluble metal in a uniform distribution. As a result, the alkali-soluble metal is contained at a proportion falling within the above-described range in any portion of the coating layer, and the present inventors consider that a state suitable for removing the alkali-soluble metal from the coating layer in the subsequent step can be provided across a large extent of the coating layer.

In order to suppress oxidation of the coating layer, the heat treatment is performed preferably at a temperature of 200° C. or higher and 500° C. or lower, more preferably 200° C. or higher and 400° C. or lower.

The heat treatment is performed for a period of time preferably of 0.5 hour or more and 24 hours or less, more preferably 1 hour or more and 12 hours or less.

The heat treatment is performed in an atmosphere preferably of an inert gas or a reducing gas. Examples of such a gas include argon gas, nitrogen gas, hydrogen gas, and a gaseous mixture thereof.

<Step of Removing the Alkali-Soluble Metal from the Coating Layer>

Figure 7:
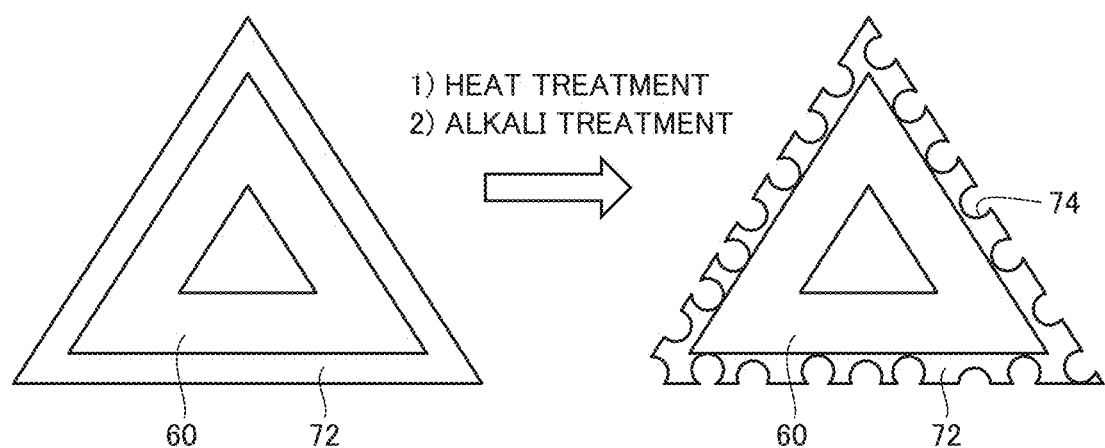
FIG. 7 is a schematic diagram for illustrating a method for manufacturing a metal porous body according to the present embodiment.

In this step, the heat-treated coating layer is immersed in an alkaline aqueous solution to remove the alkali-soluble metal from the coating layer (hereinafter, this operation may be referred to as an "alkali treatment"). By performing this step, the alkali-soluble metal is removed from the coating layer and thus leaves fine pores in the coating layer (for example see FIG. 7). As a result, a coating layer having fine pores can be provided on the framework. When the framework includes the alkali-resistant first metal and the alkali-soluble metal, performing this step removes the alkali-soluble metal from the framework and thus leaves fine pores in the framework.

While the alkaline aqueous solution is not particularly limited, examples thereof include an aqueous solution of sodium hydroxide and an aqueous solution of potassium hydroxide. The alkaline aqueous solution may include another solvent such as ethanol within a range which does not prevent the alkali-soluble metal from dissolving.

While the alkaline aqueous solution is not particularly limited in concentration insofar as it can dissolve the alkali-soluble metal, it preferably has a concentration of 1 mol/L or more and 10 mol/L or less, more preferably 3 mol/L or more and 7 mol/L or less from the viewpoint of reducing the period of time for the alkali treatment.

The alkali treatment is performed preferably at room temperature (25° C.) or higher and 100° C. or lower, more preferably 30° C. or higher and 90° C. or lower.

While how long the alkali treatment is performed can be set, as appropriate, by concentration and temperature, examples thereof include 3 minutes or more and 12 hours or less, 3 minutes or more and 180 minutes or less, and the like. Normally, hydrogen gas is generated while the alkali-soluble metal is dissolved by the alkali treatment. Therefore, it may be determined that the alkali treatment is terminated when generation of hydrogen gas is no longer observed.

The amount of the residue of the alkali-soluble metal (for example, Zn) after the alkali treatment is preferably 0% by mass or more and 30% by mass or less, more preferably 0% by mass or more and 15% by mass or less with reference to the total mass of the framework and the coating layer after the alkali treatment. When the alkali-soluble metal such as Zn remains in the coating layer in a large amount, hydrogen gas tends to be generated unexpectedly in using the metal porous body when it is exposed to an alkaline atmosphere.

Examples

Hereinafter, the present invention will more specifically be described with reference to examples although the present invention is not limited thereto.

<<Producing the Metal Porous Body>>

The metal porous body of the present example was produced through the following procedure:

<Step of Preparing the Framework>

As a framework for a metal porous body, a metal porous body of nickel having a three-dimensional network structure having a mass of 0.3 g/cm$^3$ per unit volume, a thickness of 1 mm, an average pore diameter of 420 μm, and a porosity of 96.6% (trade name: Celmet® produced by Sumitomo Electric Industries Ltd.) was used.

<Step of Forming the Coating Layer>

Subsequently, Dainjin alloy (trade name) manufactured by Daiwa Kasei Industry Co., Ltd. was used as a plating bath, and while the plating bath was agitated, the metal porous body's framework (Ni) had a surface plated with an NiZn alloy, which serves as the coating layer, in an amount of 0.2 g/cm$^3$ so that the metal porous body was plated with the NiZn alloy.

(Analyzing the Coating Layer)

Using the metal porous body plated with the NiZn alloy, X-ray diffraction measurement (XRD measurement) was performed under the conditions indicated below. As a result, a peak originating from Ni and a peak originating from $Ni_2Zn_{11}$ were detected. The peak originating from Ni originates from Ni constituting the framework. The peak originating from $Ni_2Zn_{11}$ originates from the coating layer of the NiZn alloy. As the peak originating from $Ni_2Zn_{11}$ was detected, it was estimated that the coating layer contained Zn at a proportion of 15 to 25% by mass.

Conditions for XRD Measurement

Measurement instrument: Empyrean (trade name) manufactured by Malvern Panalytical Ltd.
X-ray used: Cu-Kα, line focus
Excitation condition: 45 kV, 40 mA
Incident optical system: mirror
Light receiving optical system: Flat plate collimator 0.27°
Scanning method: θ-2θ scan
Measurement range: 2θ=10° to 90°
Step: 0.03°
Cumulative time: 1 sec In order to determine details of the proportion at which the coating layer contained Zn, the metal porous body was dissolved and the Zn content was determined through high frequency inductively coupled plasma mass spectrometry (ICP-MS). The proportion at which Zn is contained was determined from a ratio of the determined Zn content to the total mass of the framework and the coating layer. As a result, it was found that the Zn was contained at a proportion of 23.5% by mass.

<Step of Heat-Treating the Coating Layer>

The metal porous body plated with the NiZn alloy was placed inside a gas substitution muffle furnace. Subsequently, in an Ar gas atmosphere, and with the gas substitution muffle furnace internally having a temperature of 380° C., the plated metal porous body was subjected to a heat treatment for 1 hour, and thereafter cooled and ejected, and a heat-treated metal porous body was thus obtained.

<Step of Removing the Alkali-Soluble Metal from the Coating Layer>

The heat-treated metal porous body was immersed in a 7 mol/L aqueous solution of potassium hydroxide at room temperature (25° C.) for 12 hours to dissolve and thus remove Zn from the coating layer. The metal porous body according to the present example was thus produced through the above steps.

<<Evaluating State of Metal Porous Body>>

<State of Surface of Metal Porous Body>

Figure 8:
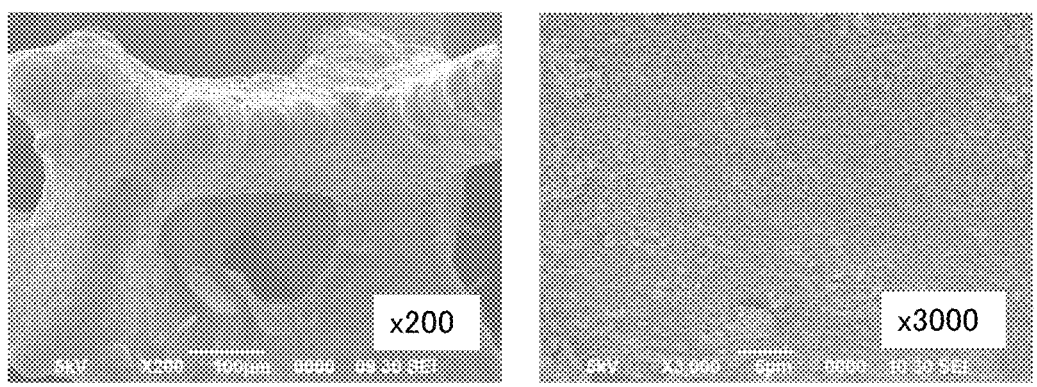
FIG. 8 is an enlarged photographical image of the metal porous body according to the present embodiment before a heat treatment and an alkali treatment are performed.
Figure 9:
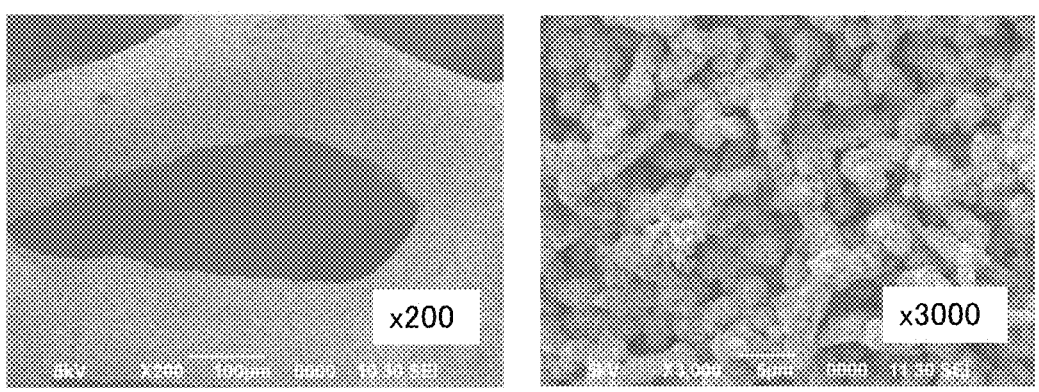
FIG. 9 is an enlarged photographical image of the metal porous body according to the present embodiment after the heat treatment and the alkali treatment are performed.

A SEM-EDX device (an SEM part: trade name "SUPRA35VP" manufactured by Carl Zeiss Microscopy Co., Ltd., and an EDX part: trade name "octane super" manufactured by AMETEK, Inc.) was used to confirm the state of a surface of the metal porous body according to the present example under the conditions indicated below. In addition, as a comparative example, the state of a surface of a metal porous body which was not subjected to a heat treatment and an alkali treatment (a metal porous body plated with an NiZn alloy) was also confirmed in the same method (see FIG. 8). As a result, the metal porous body of the comparative example included a coating layer having a smooth surface (see FIG. 8, a photographical image at a magnification of 3000 times). In contrast, it has been found that the metal porous body according to the present example includes a coating layer having a surface with fine pores having a fine pore diameter of about 10 nm to 200 nm (see FIG. 9, a photographical image at a magnification of 3000 times). The fine pores had an average fine pore diameter of 192 nm. From this result, it has been suggested that the metal porous body according to the present example has an increased surface area as compared with the metal porous body of the comparative example. Furthermore, it has been found in an elemental analysis that the coating layer has Zn remaining therein in an amount of about 4.5% by mass with respect to the total mass of the framework and the coating layer.

Measurement Conditions
Observation: Acceleration voltage of 5 kV
Analysis: Acceleration voltage of 15 kV <<Evaluating Metal Porous Body in Function>>

The following measurement was performed to evaluate the metal porous body in function.

<Strength of Metal Porous Body>

As an index for strength, a load applied for compression and an amount of deformation were measured, and evaluation was made for a load measured when deformation reached 50% as a 50% proof stress. The strength test was conducted using a portion of the above metal porous body cut by a length of 25 mm. Further, the strength test was conducted by recording and analyzing a stress-strain curve obtained when compression was done up to a load of 4,600 N at a rate of 0.3 mm/min. The strength test was conducted using Autograph AG-X plus 20 kN (trade name) manufactured by Shimadzu Corporation as a strength tester. A result is shown in Table 1.

<Evaluating an Electrolytic Current>

As one exemplary application, the metal porous body as an electrode for alkaline water electrolysis was evaluated through the procedure described below. In addition to the metal porous body according to the present example (Example 1), a porous nickel body before NiZn plating was applied (Comparative Example 1) was also evaluated to be compared with that of the present embodiment.

Linear sweep voltammetry (LSV) on the oxygen generating side was conducted in an aqueous solution of potassium hydroxide (8 mol/L) at 30° C. Measurement was conducted at 10 mV/s under a condition of 0.5 to 1.5 V/s vs SHE (standard hydrogen electrode), and values of a current for 1.0 V and 1.4 V were compared as an electrolytic current's characteristics. A result is shown in Table 1. As a result, it has been found that the metal porous body according to Example 1 exhibits a higher electrolytic current than the porous Ni body of Comparative Example 1 and is thus suitable for an electrode for alkaline water electrolysis.

TABLE 1

|  | ex. 1 | comp. ex. 1 |
|---|---|---|
| framework (alkali-resistant 1st metal) | Ni | Ni |
| coating layer (alkali-resistant 2nd metal & alkali-soluble metal) | NiZn plating | — |
| heat treatment/alkali treatment | applied | — |
| proportion of alkali-soluble metal (Zn) contained in coating layer | 4.5% by mass | — |
| state of surface of coating layer | fine pores | gentle irregularities |
| fine pores' average fine pore diameter | 192 nm | — |
| 50% proof stress | 1.6 MPa | 1.6 MPa |
| electrolytic current for 1.0 V | 450 mA/cm$^2$ | 150 mA/cm$^2$ |
| electrolytic current for 1.4 V | 976 mA/cm$^2$ | 403 mA/cm$^2$ |

In Table 1, "—" means that the treatment or interest, the measurement of interest, or the like was not performed.

Although embodiments and examples of the present invention have been described as described above, it has also been planned from the beginning to appropriately combine the configurations of the above-described embodiments and examples.

The embodiments and examples disclosed herein are illustrative in all respects and should not be construed as being restrictive. The scope of the present invention is shown not by the above-described embodiments and examples but by the claims, and is intended to include all modifications within the scope and meaning equivalent to the claims.

REFERENCE SIGNS LIST 1 rib, 2 node, 10 frame, 11 virtual plane, 20 cell, 30 three-dimensional network structure, 50 metal porous body, 60 framework, 72 coating layer, 74 fine pores.

The invention claimed is:

1. A metal porous body having a three-dimensional network structure, comprising:
a framework forming the three-dimensional network structure; and
a coating layer having fine pores and coating the framework,
the three-dimensional network structure including a rib and a node connecting a plurality of ribs,
the framework including an alkali-resistant first metal,
the fine pores having an average fine pore diameter of 10 nm or more and 192 nm or less,
the coating layer being composed of an alloy including an alkali-resistant second metal and an alkali-soluble metal, wherein the alloy including the alkali-resistant second metal and the alkali-soluble metal is a NiZn alloy that includes Ni$_2$Zn$_{11}$,
the alkali-soluble metal being contained at a proportion exceeding 0% by mass and 30% by mass or less with reference to a total mass of the framework and the coating layer.

2. The metal porous body according to claim 1, wherein the metal porous body has a porosity of 40% or more and 97% or less.

3. The metal porous body according to claim 1, wherein when the framework is observed in cross section at a magnification of 3,000 times, five or less voids having a longer diameter of 1 μm or more are observed in any area 10 μm square.

4. The metal porous body according to claim 1, wherein the alkali-resistant first metal includes at least one selected from the group consisting of Ni, Fe, Ti, Cr and Co.

5. The metal porous body according to claim 1, wherein the rib and the node are internally hollow.

6. The metal porous body according to claim 5, wherein the hollow is triangular in shape in a cross section orthogonal to a longitudinal direction of the rib.

* * * * *